(12) United States Patent
Shiono et al.

(10) Patent No.: US 8,018,801 B2
(45) Date of Patent: Sep. 13, 2011

(54) OPTICAL INFORMATION REPRODUCTION DEVICE

(75) Inventors: Teruhiro Shiono, Osaka (JP); Seiji Nishino, Osaka (JP); Tatsuo Itoh, Osaka (JP)

(73) Assignee: Panasonic Corporation, Osaka (JP)

( * ) Notice: Subject to any disclaimer, the term of this patent is extended or adjusted under 35 U.S.C. 154(b) by 793 days.

(21) Appl. No.: 10/563,274

(22) PCT Filed: Nov. 1, 2004

(86) PCT No.: PCT/JP2004/016233
§ 371 (c)(1),
(2), (4) Date: Jan. 4, 2006

(87) PCT Pub. No.: WO2005/055216
PCT Pub. Date: Jun. 16, 2005

(65) Prior Publication Data
US 2006/0140070 A1   Jun. 29, 2006

(30) Foreign Application Priority Data
Dec. 4, 2003 (JP) ................ 2003-406469

(51) Int. Cl.
*G11B 7/00* (2006.01)
(52) U.S. Cl. ............ 369/44.23; 369/112.01; 369/44.37
(58) Field of Classification Search .......... 369/94, 369/13.26, 44.12, 44.37, 44.26, 44.34, 112.01, 369/275.4, 275.3, 112.29, 44.18, 44.22, 97, 369/13.35, 44.23
See application file for complete search history.

(56) References Cited

U.S. PATENT DOCUMENTS
4,100,577 A  7/1978 Naruse et al.
5,406,545 A * 4/1995 Kadowaki ............. 369/275.3
(Continued)

FOREIGN PATENT DOCUMENTS
JP   63-306546   12/1988
JP   5-189833   7/1993
(Continued)

OTHER PUBLICATIONS

Shiono, et al., "Microexplosion Recording in Spin-Coated Polymer Films Including ZnO Nanoparticles for 3D Optical Memory"International Symposium on Optical Memory 2003, ISOM2003 Secretariat.

(Continued)

*Primary Examiner* — Hoa T Nguyen
*Assistant Examiner* — Kim Chu
(74) *Attorney, Agent, or Firm* — Hamre, Schumann, Mueller & Larson, P.C.

(57) ABSTRACT

An information recording medium of the optical information reproduction device of the present invention includes a recording unit capable of recording information three-dimensionally and provided with a track, and information is recorded by forming a plurality of recording marks along the track of the recording unit by a mark length recording method. When the track direction of the recording marks is assumed to be their longitudinal direction and the direction perpendicular to the track direction is assumed to be their lateral direction, with the present invention, for recording marks located substantially in the same plane, the total area of elongated recording marks, whose longitudinal length is greater than their lateral length, is greater than the total area of recording marks having other than elongated shapes. The optical information reproduction device of the present invention includes a first light source for emitting a reproduction light having a wavelength $\lambda_1$, an objective lens for focusing the reproduction light on the recording unit, and a first photodetector for detecting a reproduction signal from the reflected light from the recording unit. The focused reproduction light includes as its main component a polarized light component that is polarized perpendicular to the track direction. Also, the recording unit has a track pitch of no more than 1.3 times the wavelength $\lambda_1$ of the reproduction light.

29 Claims, 7 Drawing Sheets

U.S. PATENT DOCUMENTS

| | | | |
|---|---|---|---|
| 5,528,576 A | | 6/1996 | Nishikawa |
| 5,602,825 A | * | 2/1997 | Sugaya et al. ............. 369/275.4 |
| 5,673,245 A | * | 9/1997 | Yanagawa et al. ....... 369/112.29 |
| 6,243,326 B1 | * | 6/2001 | Sumi et al. ................. 369/13.29 |
| 6,256,283 B1 | * | 7/2001 | Fukakusa et al. ........ 369/112.01 |
| 2002/0060979 A1 | | 5/2002 | Tsukuda et al. |
| 2005/0058028 A1 | * | 3/2005 | Aoyama et al. ............ 369/13.35 |

FOREIGN PATENT DOCUMENTS

| | | |
|---|---|---|
| JP | 6-168451 | 6/1994 |
| JP | 11-31337 | 2/1999 |
| JP | 11-339305 | 12/1999 |
| JP | 2001-344800 | 12/2001 |
| JP | 2003-99975 | 4/2003 |

OTHER PUBLICATIONS

Kawata, Yoshimasa, "Three-dimensional Optical Memory Using a Femtosecond Laser", Optronics, pp. 138-142, 2001 with its partial translation.

Kawata, Y. et al. "Three-dimensional optical data storage using three-dimensional optics", Optical Engineering Soc. of Photo-Optical Instrumentation Engineers, Bellingham, vol. 40, No. 10, Oct. 1, 2001, pp. 2247-2254.

Shiono, T. et al. "Microexplosion Recording in Spin-Coated Polymer Films Including ZnO Nanoparticles for Three-Dimensional Optical Memory", Japanese Journal of Applied Physics, Japanese Society of Applied Physics, Tokyo, JP, vol. 43, No. 7B, Jan. 1, 2004, pp. 4941-4944.

Nakano, M. et al. "Three-dimensional patterned media for ultrahigh-density optical memory", Applied Physics Letters, AIP, American Institute of Physics, Melville, NY, vol. 85, No. 2, Jan. 1, 2004, pp. 176-178.

ECMA: Standardizing Information and Communication Systems: "Standard ECMA-267: 120 mm DVD-Read-Only Disk" Standard ECMA-267, No. 272, Apr. 1, 2001, pp. 1-86.

* cited by examiner

PRIOR ART

FIG. 8

PRIOR ART

OPTICAL INFORMATION REPRODUCTION DEVICE

TECHNICAL FIELD

The present invention relates to an optical information reproduction device for reproducing information from an information recording medium with which information can be recorded three-dimensionally.

BACKGROUND ART

An optical information reproduction device is a device that reproduces information that has been recorded on an information recording medium such as a CD (compact disk), DVD (digital versatile disk), or other such optical disk, an optical card memory, or the like. There are also devices that further comprise a function of recording information onto such information recording media (hereinafter optical information reproduction devices that also comprise a recording function will sometimes be referred to as optical information recording and reproduction devices).

Figure 7:
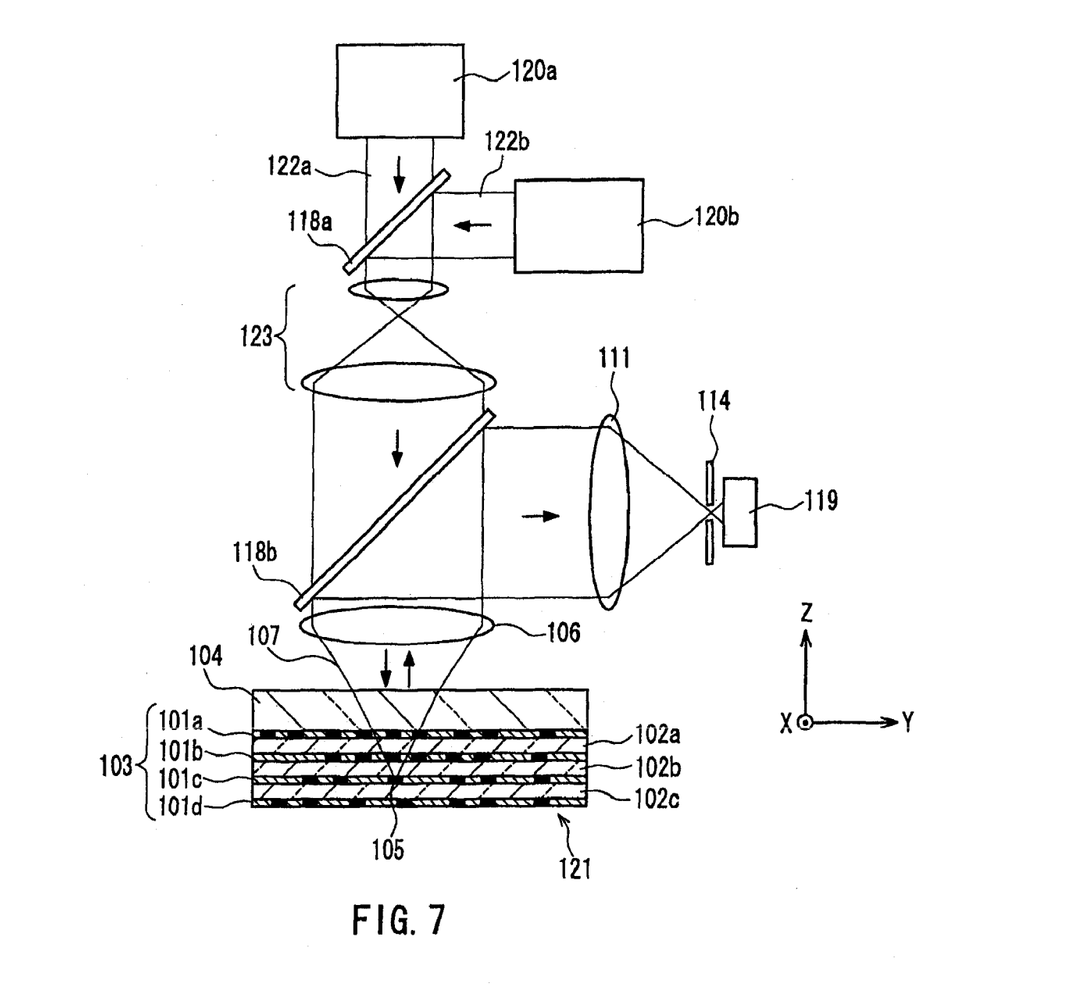
FIG. 7 is a simplified diagram illustrating the constitution of an example of a conventional optical information recording and reproduction device, and how light is conveyed.

Information recording media with a multilayer structure, in which a plurality of recording layers are stacked over one another, have been provided as information recording media capable of recording information three-dimensionally in order to further increase capacity. FIG. 7 illustrates an example of a conventional optical information recording and reproduction device that includes an information recording medium with such a multilayer structure (see, for example, Yoshimasa Kawata, "Three-dimensional Optical Memory Using a Femtosecond Laser," *Optronics*, pp. 138-142 (2001)).

With the information recording medium 121 shown in FIG. 7, a recording unit 103 is provided on a glass substrate 104, and the recording unit 103 is formed by alternating recording layers 101a to 101d with intermediate layers 102a to 102c. Specifically, the information recording medium 121 is capable of recording information three-dimensionally because a plurality of recording layers are stacked in the optical axis direction (the Z axis direction in the drawing) of an objective lens (the objective lens 106 for focusing recording light or reproduction light on the recording layers).

A recording light source 120a and a reproduction light source 120b are provided in the conventional optical information recording and reproduction device shown in FIG. 7. The recording light source 120a is a titanium sapphire laser. The recording light 122a emitted from this light source 120a, which has a wavelength of 790 nm and a high peak power, goes through a beam splitter 118a, the beam diameter is expanded by a beam expander 123, and the beam then goes through a beam splitter 118b and is focused (as converged light 107) by an objective lens 106 on the target recording layer (the recording layer 101c in the drawing) of a multilayer information recording medium 121 capable of three-dimensional recording. Information is recorded by forming recording pits 105 as recording marks in the recording layer 101c by utilizing the nonlinear absorption (such as two-photon absorption) that occurs in the focusing unit.

The reproduction light source 120b is a helium-neon laser. The reproduction light emitted from this light source 120b, which has a wavelength of 0.6328 μm and a low peak power, is bent in the −Z axial direction by the beam splitter 118a, after which it goes through the same optical path as the recording light 122a and is focused on the target recording layer (the recording layer 101c in the drawing). The light reflected by the recording pits 105 is bent in the Y axial direction by the beam splitter 118b and focused on a detection lens 111. A pinhole plate 114 having a pinhole is disposed at the focal point of the detection lens 111, and a signal can be reproduced by detecting light that has passed through the pinhole with a photodetector 119.

Figure 8:
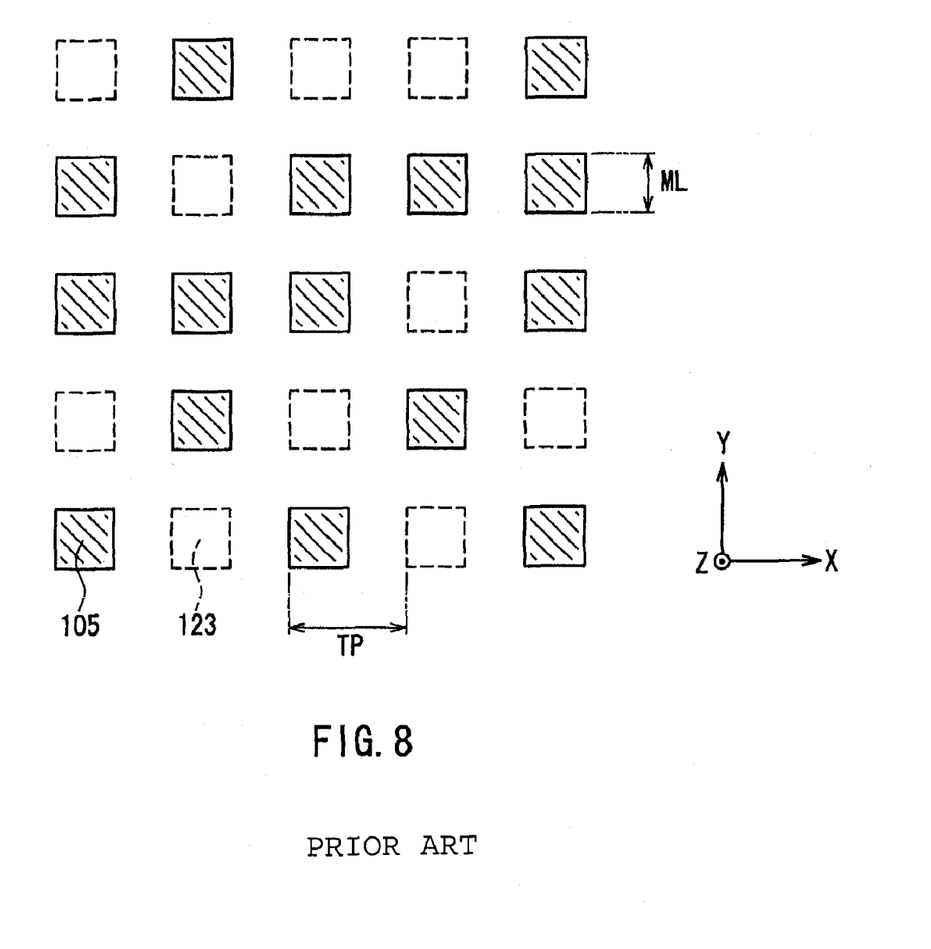
FIG. 8 is a schematic diagram illustrating the recording marks recorded on an information recording medium included in the optical information recording and reproduction device shown in FIG. 7.

FIG. 8 shows the XY plane perpendicular to the Z axis, and schematically illustrates the recording pits 105 formed in one recording layer. The recording pits 105 are hatched in this drawing. The squares shown by broken lines are non-recording pits. The recording pits 105 are square, the mark length, which is the pit size in the Y axial direction (labeled ML in the drawing) is 0.5 μm, and the track pitch (labeled TP in the drawing) is 1 μm. In the drawing, the Y axial direction is the track direction, and the X axial direction is perpendicular to the track direction.

As shown in FIG. 8, the recording of information with the above-mentioned conventional optical information recording and reproduction device is accomplished by a mark position recording method, in which the size of the recording pits is consistent and information is recorded according to whether or not a pit is formed. Mark length recording, meanwhile, is a recording method that affords a greater recording capacity than this mark position recording. Mark length recording is a method in which recording is performed by varying the length of the recording marks, and affords a recording capacity of about two times or more as compared to mark position recording.

However, with the above-mentioned conventional device, in the reproduction of information that has been recorded to a target recording layer (such as the recording layer 101c shown in FIG. 7), light is lost through diffraction loss of the converged light 107 due to the recording pits formed in the recording layers 101a and 101b located in front of the target layer (on the incident light side, and the objective lens 106 side), and this adversely affects the reproduction of information. Specifically, when there are many recording layers in front of the target layer, the light is attenuated by the time it reaches the target recording layer, making reproduction impossible, so it has been difficult to reproduce information from large-capacity information recording media having many layers.

DISCLOSURE OF INVENTION

The optical information reproduction device of the present invention comprises an information recording medium that includes a recording unit capable of recording information three-dimensionally and provided with a track having a specific track pitch, with which information is recorded by forming a plurality of recording marks along the track of the recording unit by a mark length recording method, and when the track direction of the recording marks is assumed to be their longitudinal direction and the direction perpendicular to the track direction is assumed to be their lateral direction, for recording marks located substantially in the same plane, the total area of elongated recording marks, whose longitudinal length is greater than their lateral length, is greater than the total area of recording marks having other than elongated shapes; a first light source for emitting reproduction light having a wavelength $\lambda_1$; an objective lens for focusing the reproduction light emitted from the first light source on the recording unit of the information recording medium; and a first photodetector for detecting a reproduction signal from the reflected light from the recording unit, wherein the information recording medium has a track pitch of no more than 1.3 times the wavelength $\lambda_1$ of the reproduction light, and when focused on the information recording medium, the reproduction light includes as its main component a polarized light component that is polarized perpendicular to the track direction of the information recording medium. The phrase "includes as its main component a polarized light component that is polarized perpendicular to the track direction" means that the amplitude of the polarized light component that is polarized perpendicular (X direction illustrated in FIG. 1 or 2) to the track direction is greater than that of other polarized light components. The "track" referred to here includes, in addition to a configuration in which a track groove is formed, a configuration in which no track groove is formed and no recording marks are formed, and instead a track hypothetically is assumed to be a path over which recording marks are recorded.

The optical information reproduction device of the present invention encompasses an optical information recording and reproduction device equipped with a recording mechanism as well as a mechanism for reproducing information.

BEST MODE FOR CARRYING OUT THE INVENTION

With the optical information reproduction device of the present invention, light that includes as its main component a polarized light component that is polarized perpendicular to the track direction of the information recording medium (such as linearly polarized light that is polarized perpendicular to the track direction, or elliptically polarized light whose main component is a polarized light component that is polarized perpendicular to the track direction) is used as the reproduction light in the reproduction of information that has been recorded by a mark length recording method in the recording unit of an information recording medium capable of recording information three-dimensionally. Furthermore, the track pitch of the information recording medium is no more than 1.3 times the wavelength $\lambda_1$ of the reproduction light. If we assume one recording plane (one recording layer) to comprise a string of recording marks formed substantially in the same plane within the recording unit, then the reproduction light of the device of the present invention affords a reduction in diffraction loss attributable to recording marks of any recording layers located in front of the recording layer where the information to be reproduced is recorded (on the incident light side, and the objective lens side). As a result, information can be reproduced at a good SN ratio (S/N) even with an information recording medium in which information has been recorded three-dimensionally. Since information can be reproduced even when there are many recording layers, it is possible to increase the capacity by increasing the number of layers.

With the optical information reproduction device of the present invention, it is possible to employ a configuration in which the first light source emits reproduction light including as its main component a polarized light component that is polarized perpendicular to the track direction of the information recording medium, or a configuration which further comprises an optical component (such as a wavelength plate), located along the optical path between the first light source and the objective lens, for switching the state of polarization of the reproduction light emitted from the first light source, so that the reproduction light focused on the recording unit will include as its main component a polarized light component that is polarized perpendicular to the track direction of the information recording medium.

The optical information reproduction device of the present invention also may be an optical information recording and reproduction device equipped with not only a mechanism for reproducing information, but also a recording mechanism. In this case, it is possible to employ a configuration in which the first light source further emits recording light, or a configuration that further comprises a second light source for emitting recording light. In the case of an optical information recording and reproduction device, the objective lens is capable of focusing recording light, just as with reproduction light, on the recording unit included in the information recording medium. Here, the recording light focused on the recording unit may include as its main component a polarized light component that is polarized perpendicular to the track direction of the information recording medium. Also, the wavelength $\lambda_1$ of the reproduction light may be different from the wavelength $\lambda_2$ of the recording light and the optical information reproduction device further may comprise an optical component, located along the optical path between the first light source and the objective lens, for switching between a polarization state of reproduction light emitted from the first light source and a polarization state of recording light emitted from the first light source or the second light source, and for utilizing this difference in wavelength so that the reproduction light focused on the recording unit will include as its main component a polarized light component that is polarized perpendicular to the track direction of the information recording medium, and so that the recording light focused on the recording unit will be circularly polarized light. This optical component can be a wavelength plate that functions substantially as a $\lambda_1/2$ integer multiplier with respect to the reproduction light (that is, as a $\lambda_1/2$ plate, a $\lambda_1$ plate, a $3\lambda_1/2$ plate, or the like), and functions substantially as a $\lambda_2/4$ plate with respect to the recording light. Recording marks may be formed on the recording unit by utilizing nonlinear absorption and using pulsed light as the recording light. The "nonlinear absorption" referred to in this specification is a phenomenon whereby the absorption sensitivity of the recording unit is not proportional to the energy of the irradiating light, and includes, for example, phenomena occurring when there is a threshold to the absorption sensitivity, when two-photon absorption (at which the absorption sensitivity is roughly the square of the energy of the light) or multi-photon absorption (roughly to the n-th power, where n is an integer of at least 3) is generated, when a plasma is brought about by two-photon absorption or multi-photon absorption, when any of these situations are combined, and so forth. When information is recorded by utilizing nonlinear absorption, it is preferable for the wavelength $\lambda_1$ of the reproduction light to be shorter than the wavelength $\lambda_2$ of the recording light in order to achieve even higher density.

The optical information reproduction device of the present invention may include a pinhole plate that is provided with a pinhole and is disposed along the optical path between the information recording medium and the first photodetector. A pinhole having a diameter such that light conveying the target information included in the reflected light will be transmitted is provided in this pinhole plate. The use of this pinhole plate reduces the detection of reflected light (unnecessary reflected light) from a recording layer other than the recording layer the first photodetector is supposed to reproduce, and therefore reduces interlayer crosstalk. A similar effect can be obtained, even if reflected light is not transmitted through the pinhole, by setting the surface area of the light-receiving component provided in the first photodetector to an area that will receive light that conveys the target information included in the reflected light.

The optical information reproduction device of the present invention further may comprise a second photodetector for detecting focus/track error signals, and a focus/track error signal detection element that is disposed along the optical path between the information recording medium and the second photodetector, for splitting the reflected light. Here, if a pinhole plate is provided, at least one of the beams split apart by the focus/track error signal detection element is guided to the second photodetector without passing through the pinhole.

With the optical information reproduction device of the present invention, the effect of the present invention will be better if the recording marks formed in the information recording medium are voids (this will be described in detail below). The recording marks also may be recording pits formed by utilizing refractive index changes in the recording material.

Embodiments of the present invention will now be described through reference to the drawings.

Embodiment 1

The optical information reproduction device of Embodiment 1 of the present invention will be described in detail with reference to FIGS. 1 and 2. Since the optical information reproduction device in this embodiment is equipped with a recording function as well as a reproduction function, it will be referred to below as an optical information recording and reproduction device.

Figure 1:
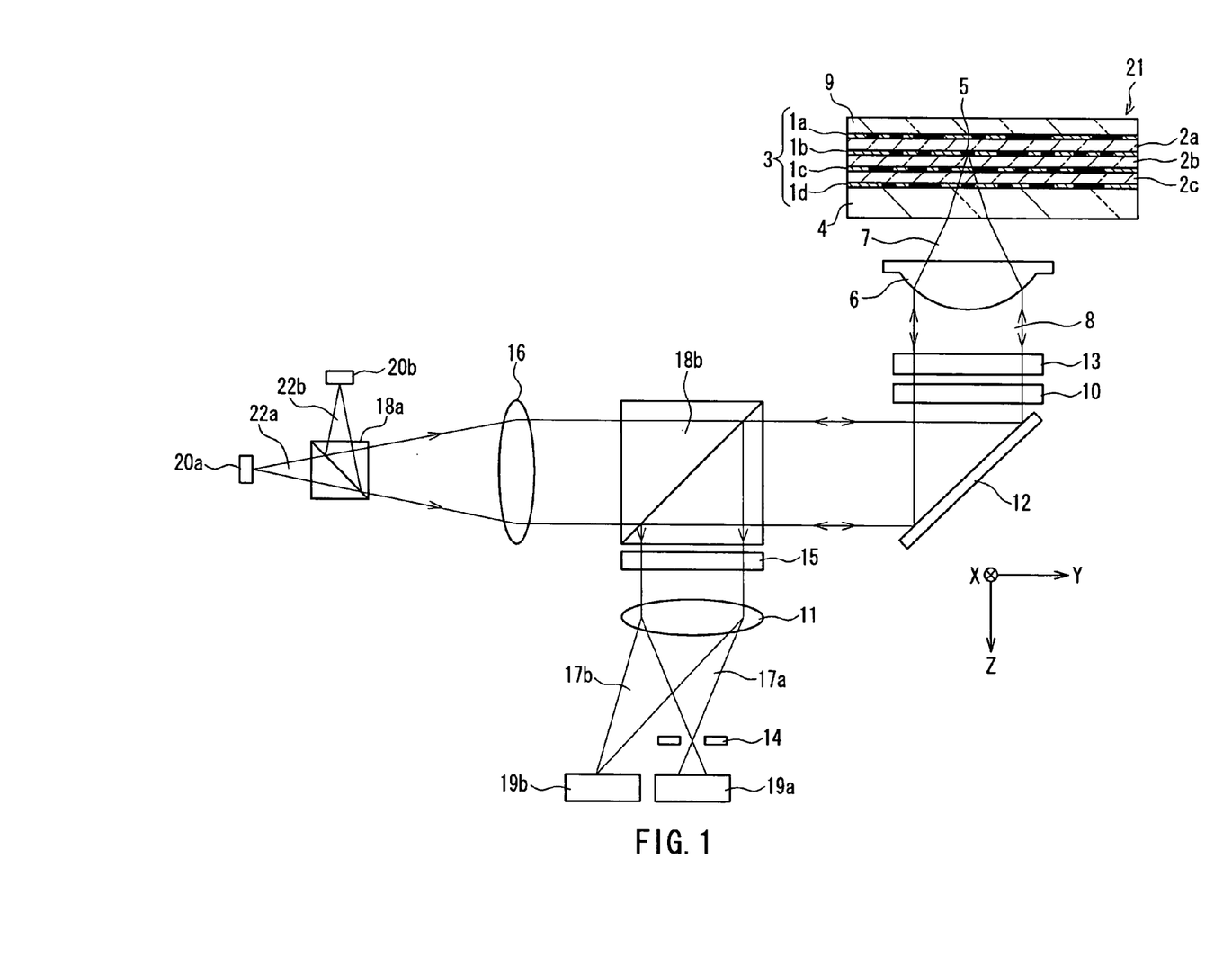
FIG. 1 is a simplified diagram illustrating the basic constitution of an embodiment of the optical information reproduction device of the present invention, and how light is conveyed.
Figure 2:
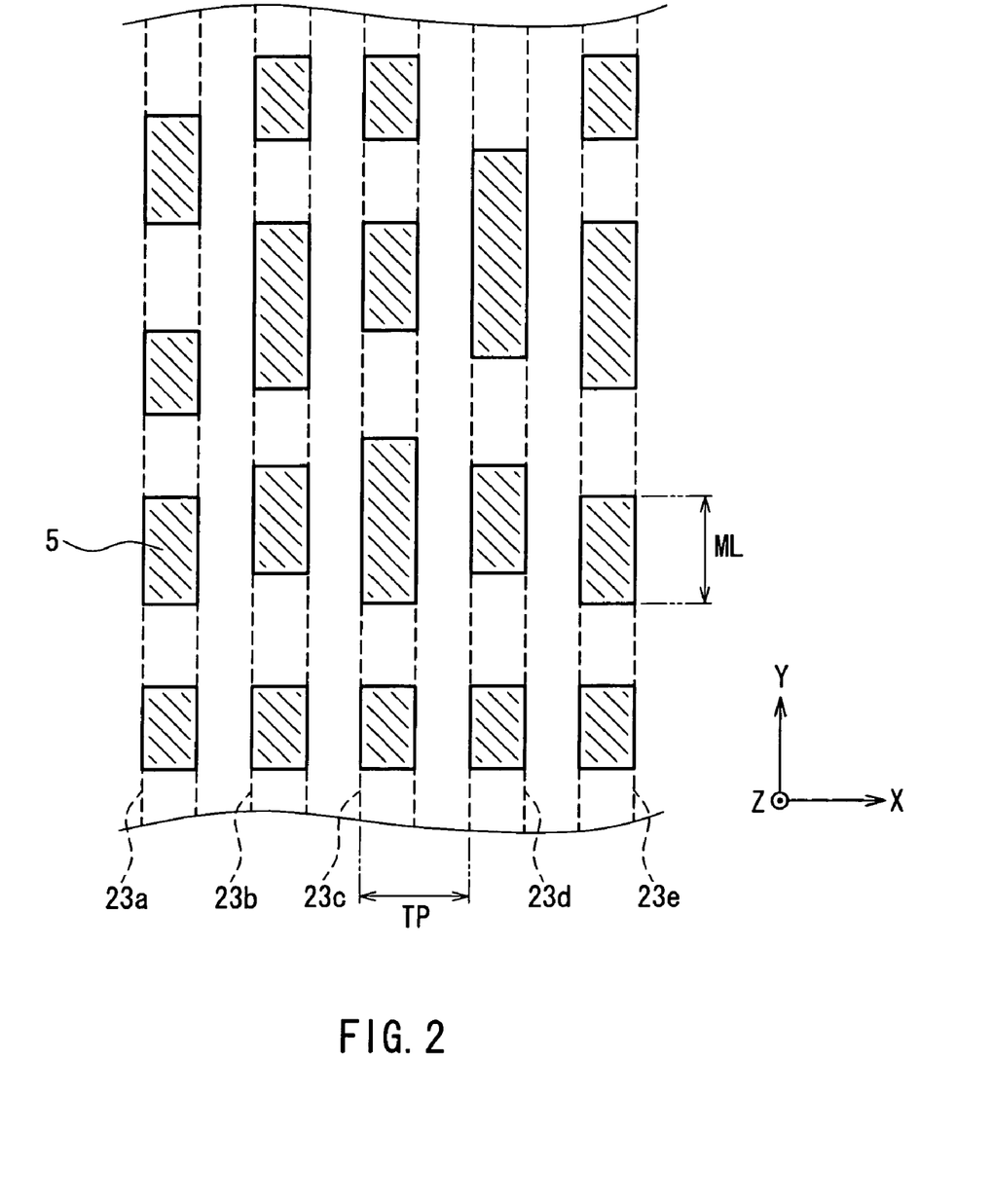
FIG. 2 is a schematic diagram illustrating the recording marks recorded on an information recording medium included in the optical information reproduction device shown in FIG. 1.

FIG. 1 is a simplified diagram illustrating the basic constitution of an embodiment of the optical information reproduction device of the present invention, and how light is conveyed. FIG. 2 is a simplified diagram illustrating the recording marks formed on an information recording medium included in this optical information recording and reproduction device.

The optical information recording and reproduction device of this embodiment is provided with two different light sources: a recording light source (second light source) 20a and a reproduction light source (first light source) 20b. The wavelength $\lambda_2$ of the recording light 22a emitted from the recording light source 20a is different from the wavelength $\lambda_1$ of the reproduction light 22b emitted from the reproduction light source 20b. A beam splitter 18a, collimator lens 16, beam splitter 18b, a reflecting mirror 12, a wavelength plate 10, a spherical aberration correction element 13, and an objective lens 6 are disposed along the optical path from these two light sources 20a and 20b to an information recording medium 21. A focus/track error signal detection element 15 and a detection lens 11 are provided along the return path, which is the optical path from the beam splitter 18b to photodetectors 19a and 19b. In addition, a pinhole plate 14 having a pinhole for reducing interlayer crosstalk in the information recording medium 21 is disposed along the optical path between the detection lens 11 and the first photodetector 19a for detecting reproduction light.

The information recording medium 21 is a medium capable of recording three-dimensionally, and comprises a recording unit 3 and a protective layer 4 provided on a substrate 9. During the recording and reproduction of information, the protective layer 4 is disposed on the incident light side. The recording unit 3 comprises recording layers 1a to 1d alternating with intermediate layers 2a to 2c. In this embodiment, the recording unit 3 is formed by four recording layers and three intermediate layers, but is not limited to this number of stacked recording layers. Also, the recording unit 3 does not necessarily need to have a multilayer structure in which a plurality of recording layers are stacked, and need only be capable of recording information three-dimensionally. Accordingly, there is no problem with using a so-called bulk structure in which the entire recording unit 3 is formed by a single recording layer, as long as this recording layer is capable of recording three-dimensionally.

The recording layers 1a to 1d of the information recording medium 21 are formed from a material whose refractive index changes as a result of thermal deformation or the like occurring at a specific temperature, for example. A portion in which a change in refractive index has occurred becomes a recording pit (recording mark) 5. FIG. 2 schematically illustrates rows of recording pits 5 formed in the tracks in one of the plurality of recording layers that make up the recording unit 3 of the information recording medium 21. In this embodiment, the tracks of each recording layer are not actual track grooves, but rather are assumed hypothetically, and the path over which recording marks are recorded is considered to be a track. However, actual track grooves or the like may be provided. In FIG. 2 only five tracks 23a to 23e are shown, and the recording pits 5 formed in the tracks are hatched. In this drawing, the Y axis indicates the track direction, while the X axis indicates a direction perpendicular to the track direction. The recording pits 5 are formed by a mark length recording method, and the length in the track direction (the length in the longitudinal direction, indicated by ML in the drawings and hereinafter referred to as the mark length) varies in a plurality of steps (such as seven steps). The width of the recording pits 5 (their length in the lateral direction) is constant. In FIG. 2, the track direction is a straight line extending in the Y axial direction, but when the information recording medium 21 is in the form of a disk, the track will be a curve that forms part of an arc. Therefore, when the information recording medium 21 is in the form of a disk, the X axial direction corresponds to the radial direction of the disk, while the Y axial direction corresponds to the tangential direction of the tracks provided to the disk.

With the information recording medium 21 of the optical information recording and reproduction device in this embodiment, the track pitch (labeled TP in the drawings) expressing the spacing between adjacent tracks is no more than 1.3 times the wavelength $\lambda_1$ of the reproduction light 22b, and preferably is no more than the wavelength $\lambda_1$ of the reproduction light 22b. Setting the track pitch in this way raises the transmissivity of the recording layers. If the wavelength $\lambda_1$ of the reproduction light 22b is 0.405 μm, for example, the track pitch can be 0.32 μm, for example. With this embodiment, the mark length of the recording pits 5 is varied in seven steps between 0.149 and 0.596 μm, corresponding to what are known as 2T to 8T recording marks. The basic length T is 0.0745 μm. The width of the recording pits 5 can be half the track pitch, or 0.16 μm, for example. In this case, the 3T to 8T recording pits 5 have an elongated shape (a shape that is elongated in the track direction) in which the length in the longitudinal direction is greater than the length in the lateral direction. Therefore, in each recording layer of the information recording medium 21, the total area of elongated recording marks is greater than the total area of recording marks having other than elongated shapes.

In this embodiment, because information is recorded onto the information recording medium 21 by utilizing nonlinear absorption such as two-photon absorption or multiphoton absorption, a semiconductor pulse laser light source that emits pulsed light with a wavelength $\lambda_2$ of 0.66 μm, for example, and a pulse width of 100 femtoseconds to 10 nanoseconds, for example, can be used favorably as the recording light source 20a. Meanwhile, a semiconductor laser light source that emits light with a wavelength $\lambda_1$ of 0.405 μm, for example, can be used for the reproduction light source 20b. Using a semiconductor laser for the light source allows both the size and cost of the product to be reduced. When information is recorded by utilizing nonlinear absorption, higher density can be achieved by making the wavelength $\lambda_1$ of the reproduction light 22b shorter than the wavelength $\lambda_2$ of the recording light 22a. The reason for this is that the recording pits formed by nonlinear absorption can be made smaller than with ordinary recording. For instance, when two-photon absorption recording is performed at $\lambda_2$=0.66 μm, the spot diameter can be $1/(2^{1/2})$ times that with ordinary recording, so the result is substantially the same as when ordinary recording is performed at a wavelength of 0.47 μm. Accordingly, if the wavelength $\lambda_1$ of the reproduction light is set to be shorter than the wavelength $\lambda_2$ of the recording light, and preferably to about $\lambda_1=\lambda_2/(2^{1/2})$, it will be possible to attain a high density that is approximately twice that when $\lambda_1=\lambda_2$.

The optical information recording and reproduction device of this embodiment is constituted such that the reproduction light 22b, when focused on the information recording medium 21, becomes linearly polarized light that is polarized perpendicular to the track direction of the information recording medium 21. When this linearly polarized light is used to reproduce information that has been recorded by the above-mentioned mark length recording method, diffraction loss of light can be reduced and a good reproduction signal obtained even when the light has to be transmitted through other recording layers before reaching the target recording layer. There are no particular restrictions on the state of polarization of the recording light focused on the information recording medium 21, but this embodiment constitutes a device in which circularly polarized light is used.

The wavelength plate 10 is disposed along the common optical path of the recording light 22a and the reproduction light 22b between the objective lens 6 and the light sources 20a and 20b, and is designed so that the difference in wavelengths is utilized to make this plate substantially a ¼ wavelength plate, or close thereto, with respect to the wavelength $\lambda_2$ of the recording light 22a, and is designed to be a wavelength plate of substantially ½ an integer multiple with respect to the wavelength $\lambda_1$ of the reproduction light 22b, that is, a ½ wavelength plate, a 1 wavelength plate, a 3/2 wavelength plate, or the like, or close thereto. This is so that the reproduction light 22b, when focused on the information recording medium 21, will be linearly polarized light, and the recording light 22a will be circularly polarized light. The beam splitter 18a also is designed to utilize the difference in wavelengths so as to transmit the recording light 22a and reflect the reproduction light 22b. The beam splitter 18b is designed to utilize the difference in wavelengths so as to function as a polarized light beam splitter with respect to the recording light 22a, and function as a half mirror that is almost nonexistent in the polarization direction with respect to the reproduction light 22b.

Next, how to record with the optical information recording and reproduction device of this embodiment will be described. As shown in FIG. 1, during recording, the recording light 22a, which is pulsed laser light of relatively high peak power and linearly polarized light emitted in the Y axial direction from the recording light source 20a, goes through the beam splitter 18a, is made into approximately parallel light by the collimator lens 16, passes through the beam splitter 18b, and its optical path is bent in the −Z axial direction by the reflecting mirror 12. The recording light 22a that has been bent in the −Z axial direction is converted into substantially circularly polarized light by the wavelength plate 10, then passes through the spherical aberration correction element 13 (the light labeled 8 in FIG. 1), is focused by the objective lens 6 (with a numerical aperture NA of 0.85 and a focal distance of 2 mm, for example) through the protective layer 4 of the information recording medium 21 and onto the target recording layer of the recording unit 3 (the recording layer 1b in FIG. 2) (the light focused on the information recording medium 21 will hereinafter sometimes be referred to as the converged light 7), and nonlinear absorption such as two-photon absorption or multi-photon absorption is utilized to record rows of the recording pits 5 as shown in FIG. 2 on the recording layer 1b.

The thickness of the recording unit 3 through which the converged light 7 passes before reaching the target recording layer varies with the recording depth of the recording pits 5, so better recording pits 5 can be formed if the recording is performed while the amount of spherical aberration is controlled by the spherical aberration correction element 13 provided along the optical path from the recording light source 20a to the objective lens 6 according to the recording depth of the recording pits 5 to be recorded in the recording unit 3. The spherical aberration correction element 13 can be a liquid crystal element whose refractive index distribution is variable, a beam expander that combines a concave lens with a convex lens and in which the spacing between the lenses in the optical axis direction is varied with an actuator, or the like.

For example, when recording is performed by utilizing two-photon absorption, if a material that absorbs light whose wavelength is exactly one half the recording wavelength $\lambda_2$ is used as the recording material, and if this material is irradiated with recording light having a relatively high peak power (such as from several hundred milliwatts to several watts or higher) and a narrow pulse width (from 100 femtoseconds to 10 nanoseconds), the effect as if the wavelength would be halved in the portion (focal point) of highest power density of the light focused by the objective lens 6 will be resulted, absorption will occur in the recording material, and the recording pits 5 will be recorded. Since absorption thus only occurs at the focal point, there is not much attenuation of light even when recording is performed in deep recording layers. Accordingly, a recording method that utilizes nonlinear absorption is suited to a three-dimensional optical memory such as a multilayer memory.

In general, the recording pits 5 would be recorded three-dimensionally by utilizing changes in the optical constant of the recording layers 1, but with this embodiment, they are recorded mainly by utilizing changes in the refractive index of the recording material. Recording materials include photopolymers, diarylethenes and other such colorants, resins admixed ultrafine particles composed of zinc oxide (ZnO) or the like, $TeO_2$ and the like are suitable, and utilizing changes in refractive index affords a reduction in the absorption loss of light. The amount of change in the refractive index can be controlled by how the target is irradiated with recording light, but hollow pits called voids also can be formed by using pulsed light with a relatively high peak power of from several watts to several dozen kilowatts. Forming hollow pits means making holes in the recording layer. In the case of voids, the refractive index is 1.0, so if the refractive index of the recording material is 1.7, for instance, the amount of change in the refractive index will be large, at $\Delta n=-0.7$. Accordingly, the effect is that signals can be reproduced with better contrast. When a recording layer is formed from a phase changing material, since the recording involves the absorption of light, this is not suited to when there are many recording layers, but it can be used as a recording layer in an information recording medium having a multilayer structure of about two to six layers.

Next, how to reproduce with the optical information recording and reproduction device of this embodiment will be described. During reproduction, the reproduction light 22b, which is linearly polarized laser light emitted from the reproduction light source 20b, is bent in the Y axial direction by the beam splitter 18a, is made into approximately parallel light by the collimator lens 16, passes through the beam splitter 18b, and its optical path is bent in the −Z axial direction by the reflecting mirror 12. The reproduction light 22b that has been bent in the −Z axial direction passes through the wavelength plate 10 and the spherical aberration correction element 13 (the light labeled 8 in the drawing), and is focused (the converged light 7) by the objective lens 6 on the target recording layer of the recording unit 3 of the information recording medium 21 while still in the form of linearly polarized light. The reproduction light 22b focused on the information recording medium 21 by the objective lens 6 is linearly polarized light that is polarized perpendicular to the track direction of the information recording medium 21. More specifically, when the reproduction light source 20b emits linearly polarized light that is polarized parallel to the track direction, the wavelength plate 10 that functions as a ½ wavelength plate with respect to the wavelength $\lambda_1$ of the reproduction light 22b is provided and converts to linearly polarized light that is polarized perpendicular to the track direction. When the reproduction light source 20b emits linearly polarized light that is polarized perpendicular to the track direction, the wavelength plate 10 is one that functions as a 1 wavelength plate with respect to the wavelength $\lambda_1$ of the reproduction light, for example, which allows linearly polarized light to be obtained as above. Using lighting having such a polarization state as the reproduction light affords a reduction in the diffraction loss caused by the recording pits 5 in the recording layers 1c and 1d that are in front when the recording pits 5 of the recording layer 1b are being reproduced.

It is preferable to reduce the thickness of the individual recording layers in order to decrease the diffraction loss due to the recording pits 5 formed on recording layers in front, but if the recording layers are too thin, there will be a decrease in the reflectance from the recording pits 5 that becomes the information signal. Consequently, when the refractive index of the recording material is 1.7 and the recording pits 5 are voids, for example, in order to obtain a reflectance of 1 to 8%, it is preferable for the thickness of each recording layer to be between 0.02 and 0.05 μm.

The light reflected by the recording pits 5 is bent back in the opposite direction, passes through the objective lens 6, the spherical aberration correction element 13, the wavelength plate 10, and the reflecting mirror 12 in that order, its optical axis is bent in the Z direction by the beam splitter 18b, the beam is split into a plurality of beams by the focus/track error signal detection element 15 (for the sake of simplicity in FIG. 1, the split beams are not shown along the optical path from the diffraction type focus/track error signal detection element 15 to the detection lens 11), and these are made into converged light 17a and 17b by the detection lens 11. The rim intensity on the detection lens 11 is 0.8, for example. The converged light 17a, which is reflected light for obtaining a reproduction signal, passes through the pinhole provided in the pinhole plate 14, and the reproduction signal is detected by the photodetector 19a. The converged light 17b that is split off to become the focus/track error signal is detected by a separate, second photodetector 19b without passing through the pinhole. Because with this constitution the converged light 17b that becomes the focus/track error signal does not pass through the pinhole, the focus error signal and the track error signal can be detected individually by a conventional method such as astigmatism or three-beam tracking.

The focal distance of the detection lens 11 is 33 mm, for example, and the Airy disk diameter on the photodetector 19 side is 9.6 μm, for example. The pinhole plate 14 is installed so that the pinhole will be positioned at the approximate focal point of the converged light 17a for detecting the reproduction signal. The reason for this is that the light reflected by the other recording layers 1a, 1c, and 1d located above and below the recording layer 1b being reproduced, that is, crosstalk (interlayer crosstalk) light that is light reflected by the recording pits of other recording layers besides the recording pits of the recording layer intended for reproduction (unnecessary reflected light), spreads out larger than the size of the pinhole, but when the pinhole plate 14 is provided, any light that spreads out larger than the size of the pinhole does not go through the pinhole, so the effect is a reduction in interlayer crosstalk. A similar effect can be obtained by using a microscopic photodetector, whose light receiving portion is the size of the pinhole diameter, as the first photodetector 19a instead of providing the pinhole plate 14.

With this embodiment, by keeping the size of the pinhole to no more than 5 times the Airy disk diameter of the converged light 17a, it is possible to improve the quality of the reproduction signal up to a level that will pose no problem (amount of interlayer crosstalk $\leq 30$ dB) when the spacing between adjacent recording layers is between 5 and 8 μm, for example. Reducing the size of the pinhole makes it possible for the recording layers to be spaced closer together, but if the pinhole is too small, the amount of light entering the pinhole will be reduced, or the environmental temperature may cause distortion of the optical system and the converged light 17a will deviate from the center of the pinhole, so these factors need to be taken into account in determining the size of the pinhole.

As another example of the optical information recording and reproduction device, the constitution may be such that the beam splitter 18b is a half mirror that is almost nonexistent in the polarization direction with respect to both the recording light 22a and the reproduction light 22b, and no wavelength plate 10 is provided. With this constitution, there is a decrease in the utilization efficiency of the recording light 22a as compared to the optical information recording and reproduction device shown in FIG. 1, but an advantage is that this diminishes the effect of birefringence, which can occur in the information recording medium 21. As for the recording light 22a, since its polarization direction is one of little diffraction loss, it is possible to suppress the attenuation of optical intensity in the information recording medium 21.

Figure 3:
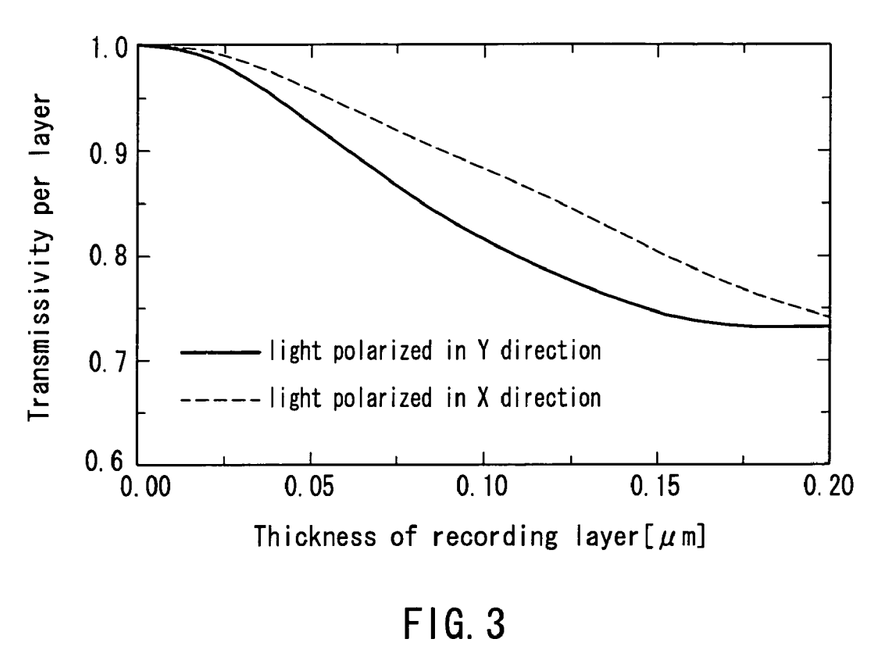
FIG. 3 is a graph of the relationship between the thickness of the recording layer and the transmissivity per recording layer of the information recording medium in a working example of the optical information reproduction device of the present invention.

Next, the change in transmissivity of a recording layer with respect to the difference in the polarization direction of the light will be discussed in detail in order to describe the relation between diffraction loss and the polarization state of the light. FIG. 3 shows the relationship between the thickness of the recording layer and the transmissivity per recording layer constituting the information recording medium 21, for two types of light of different polarization direction. Recording layers of different thickness were produced from a composite material containing approximately 45 wt % polyester and approximately 55 wt % microparticles composed of zinc oxide (ZnO), and the transmissivity of each recording layer was measured. Zinc oxide microparticles with a diameter of 30 nm or less were used. Recording marks were formed on the tracks of the recording layer at a track pitch of 0.32 μm. The recording marks here corresponded to so-called 2T to 8T recording marks, which had a width of 0.16 μm and whose mark length was varied in seven steps between 0.149 and 0.596 μm. The recording marks were voids, the refractive index in the portions of the recording layers where no voids were formed was 1.7, and the refractive index of the void portions was 1.0. The light used here was light polarized in the Y direction (linearly polarized light polarized in the track direction) and light polarized in the X direction (linearly polarized light polarized perpendicular to the track direction), and the wavelength of both was 0.405 μm.

The transmissivity of the recording layers was measured under the above conditions, which confirmed that the transmissivity is higher for light polarized in the X direction than for light polarized in the Y direction. This result tells us that when linearly polarized light that is polarized perpendicular to the track direction is used, the transmissivity of the recording layers located in front of the recording layer to be reproduced can be kept high, so there is less diffraction loss of the reproduction light. As shown in FIG. 3, the transmissivity per recording layer when the thickness is 0.035 μm, for example, is 97.5% for light polarized in the X direction and 95.8% for light polarized in the Y direction. The transmissivity in the case of circularly polarized light is the average of these two curves. For instance, the transmissivity when light passes through 10 recording layers with a thickness of 0.035 μm is 77.6% and 65.1% for light polarized in the X and Y directions, respectively, and the transmissivity when light passes through 20 layers is 60.2% and 42.3%, respectively. It thus can be seen that transmissivity is much higher for light polarized in the X direction than for light polarized in the Y direction. Since the diffraction loss of light can be lowered if transmissivity is higher, there is an increase in the SN ratio of the signal, whereby the amount of noise light decreases and the amount of reproduction signal light increases. As a result, it is possible further to increase the number of recording layers that can be stacked.

Figure 4:
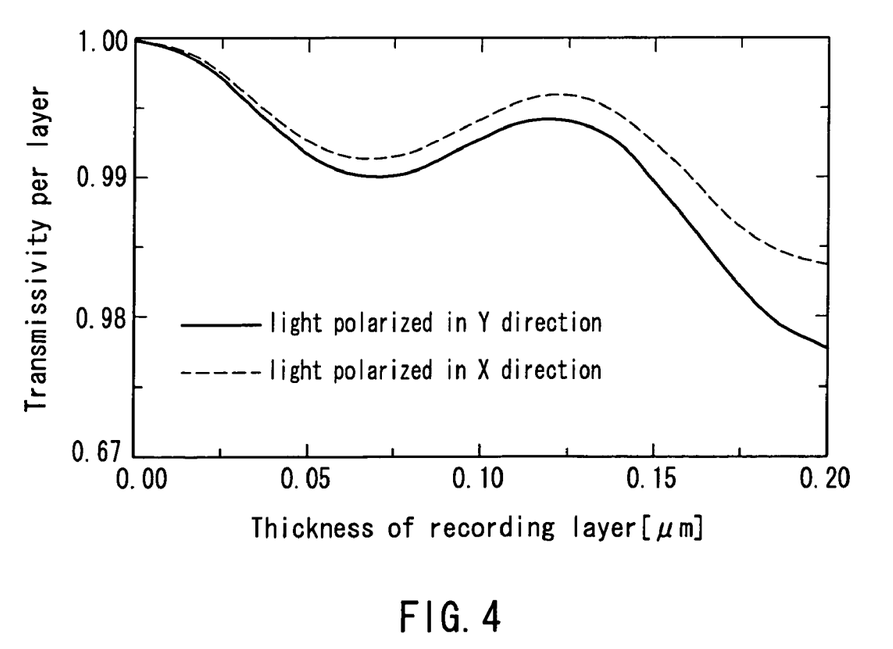
FIG. 4 is a graph of the relationship between the thickness of the recording layer and the transmissivity per recording layer of the information recording medium in another working example of the optical information reproduction device of the present invention.
Figure 5:
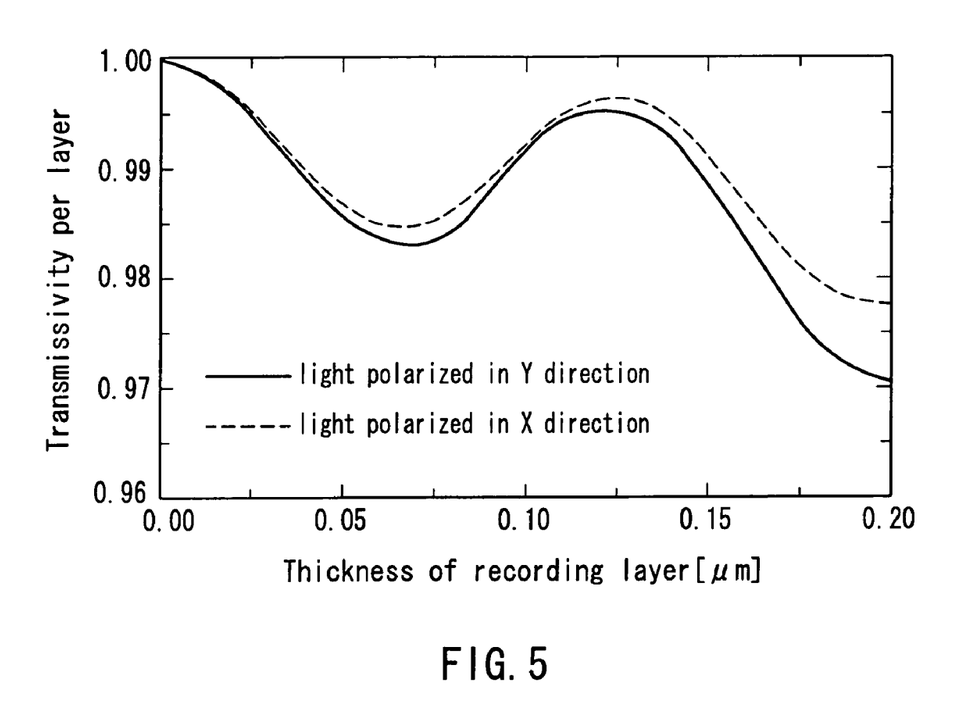
FIG. 5 is a graph of the relationship between the thickness of the recording layer and the transmissivity per recording layer of the information recording medium in yet another working example of the optical information reproduction device of the present invention.

Also, the transmissivity per recording layer similarly was measured for when a diarylethene (a photochromic material) is used for the recording material, and the recording marks are recording pits produced by changes in the refractive index. More specifically, FIG. 4 shows the results when the recording unit was produced using a UV-curing resin with a refractive index of 1.45 for an intermediate layer, and FIG. 5 shows the results when the recording unit was produced using a UV-curing resin with a refractive index of 1.40 for an intermediate layer. The refractive index of the portions where no recording marks were formed was 1.55, the refractive index of the portions with recording marks was 1.65, and the change in refractive index was Δn=0.1. The results in FIGS. 4 and 5 confirm that the transmissivity was again higher for light polarized in the X direction than for light polarized in the Y direction when a diarylethene was used for the recording material, as well.

As described in this embodiment, the reproduction light 22b focused on the information recording medium 21 preferably is linearly polarized light that is polarized perpendicular to the track direction of the information recording medium 21, but substantially the same effect will be obtained with elliptically polarized light whose main component is a polarized light component that is polarized perpendicular to the track direction.

As described above, by using linearly polarized light that is polarized perpendicular to the track direction for the reproduction light, it is possible to provide an optical information recording and reproduction device with which, when information is recorded by a mark length recording method, and when information is reproduced from an information recording medium whose recording capacity per layer is large and which has numerous layers, the diffraction loss in each recording layer can be reduced, transmissivity increased, and each recording layer can be reproduced at a good SN ratio.

Embodiment 2

The optical information recording and reproduction device in Embodiment 2 of the present invention will now be described through reference to FIG. 6, focusing on those points that differ from the optical information recording and reproduction device described in Embodiment 1.

Figure 6:
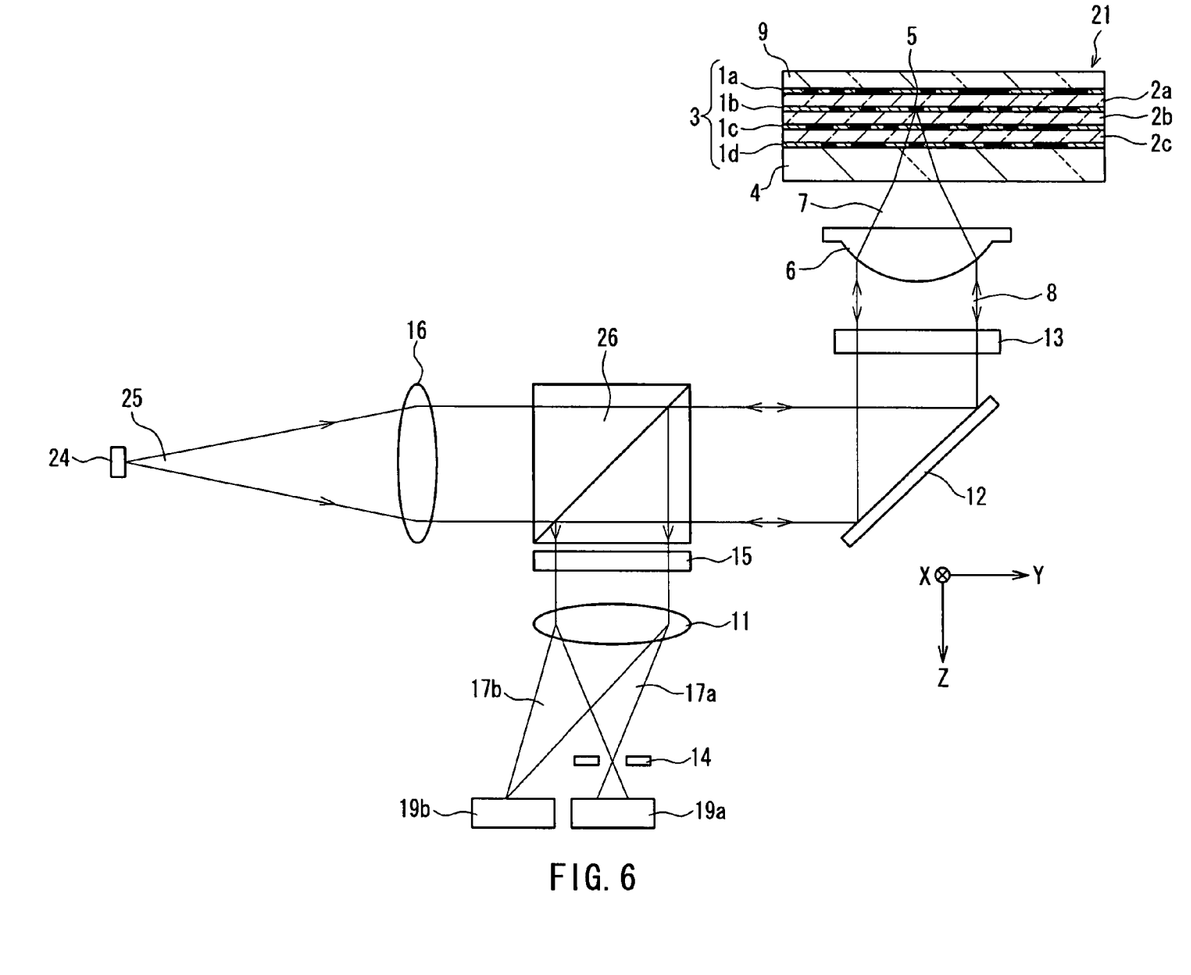
FIG. 6 is a simplified diagram illustrating the basic constitution of another embodiment of the optical information reproduction device of the present invention, and how light is conveyed.

FIG. 6 is a simplified diagram illustrating the basic constitution of the optical information reproduction device in this embodiment, and how light is conveyed.

The optical information recording and reproduction device of this embodiment comprises a light source 24 that emits light 25 as the recording light or the reproduction light, the objective lens 6 for focusing light 25 emitted from the light source 24 on any of the plurality of recording layers 1a to 1d included in the information recording medium 21, and the first photodetector 19a and a second photodetector 19b for detecting the reflected light 17a and 17b from the information recording medium 21. Further, the collimator lens 16, a beam splitter 26, the reflecting mirror 12, and the spherical aberration correction element 13 are provided in order to guide the light 25 emitted from the light source 24 to the objective lens 6. Just as in Embodiment 1, the diffraction type focus/track error signal detection element 15, the detection lens 11, and the pinhole plate 14 having at least one pinhole are provided between the beam splitter 26 and the first and second photodetectors 19a and 19b. In this embodiment, the converged light 7 that irradiates the information recording medium 21 is linearly polarized light that is polarized perpendicular to the track direction of the information recording medium 21. Those members that are numbered the same as in the device described in Embodiment 1 are members having the same function, and will not be described again in detail here. The use of the mark length recording method in the recording of information to the information recording medium 21, the shape of the recording marks, and so forth are the same as in Embodiment 1.

The optical information recording and reproduction device of this embodiment differs from the device described in Embodiment 1, for example, in that a semiconductor laser light source that emits linearly polarized light with a wavelength of 0.405 μm is used as the light source 24, and doubles as the light source for both recording light and reproduction light. The light source 24 emits a laser beam with a high peak power by employing pulsed oscillation during recording, and emits a laser beam with lower peak power by employing continuous oscillation during reproduction. This constitution is simpler because only one light source is needed. Also, using a semiconductor laser light source as the light source 24 allows both the size and cost of the product to be reduced. The semiconductor laser light source is set so that the polarization state of the linearly polarized light that is emitted will be polarization perpendicular to the track direction.

The beam splitter 26 is not a polarized light beam splitter, and is instead a half mirror that is not dependent on the polarization direction. This makes a wavelength plate unnecessary, and while there is a corresponding decrease in light utilization efficiency, an advantage is that this diminishes the effect of birefringence, which can occur in the information recording medium 21.

Just as with the optical information recording and reproduction device in Embodiment 1, using this linearly polarized light as the reproduction light makes it possible to provide an optical information recording and reproduction device that reduces diffraction loss and increases transmissivity in each recording layer, allows each recording layer to be reproduced at a good SN ratio, and can be used with information recording media that have a large recording capacity per layer and have numerous layers. Furthermore, linearly polarized light was used for the reproduction light that irradiated the information recording medium 21 in this embodiment, but the same effect will be obtained with elliptically polarized light whose main component is a polarized light component that is polarized perpendicular to the track direction of the information recording medium 21.

Also, the objective lens, collimator lens, and detection lens used in the optical information recording and reproduction devices of Embodiments 1 and 2 above were given those names for the sake of convenience, but are the same as what is generally called a lens.

Also, the optical information recording and reproduction devices of Embodiments 1 and 2 above were described by using an optical disk as an example of an information recording medium, but the present invention is not limited to this, and encompasses media of different specifications (such as thickness and recording density), and products in the form of a card, drum, or tape.

Industrial Applicability

With the optical information recording and reproduction device of the present invention, in regard to an information recording and reproduction device that includes an information recording medium having a plurality of recording layers on which information is recorded by a mark length recording method, the diffraction loss can be reduced and transmissivity increased for each recording layer, and each recording layer can be reproduced at a good SN ratio. Also, since diffraction loss can be reduced, it is possible to increase the number of recording layers that are stacked, affording even larger capacity.

The invention claimed is:

1. An optical information reproduction device, comprising:
an information recording medium that includes a recording unit having a multilayer structure of recording layers capable of recording information three-dimensionally and from which can be reproduced information recorded on one of the recording layers through any of the other recording layer or layers and provided with a track having a specific track pitch, with which information is recorded by forming a plurality of recording marks along the track of the recording unit by a mark length recording method, and when the track direction of the recording marks is assumed to be their longitudinal direction and the direction perpendicular to the track direction is assumed to be their lateral direction, for recording marks located substantially in the same plane, the total area of elongated recording marks, whose longitudinal length is greater than their lateral length, is greater than the total area of recording marks having other than elongated shapes;
a first semiconductor laser light source for emitting reproduction light having a wavelength $\lambda_1$, and for emitting recording light with a wavelength of $\lambda_2$ different from the wavelength $\lambda_1$;
an objective lens for focusing the reproduction light emitted from the first semiconductor laser light source on the recording unit of the information recording medium, and for focusing the recording light on the recording unit of the information recording medium; and
a first photodetector for detecting a reproduction signal from the reflected light from the recording unit,
wherein the information recording medium has a track pitch of no more than 1.3 times the wavelength $\lambda_1$ of the reproduction light, the first semiconductor laser light source has a characteristic such that it emits the reproduction light in which an amplitude of a polarized light component that is polarized perpendicular to the track direction is greater than that of other polarized light components, and further comprising
an optical component that functions so as to convert the state of polarization of the recording light emitted from the first semiconductor laser light source, whereby the amplitude of a polarized light component of the recording light that is polarized perpendicular to the track direction is caused to be greater than that of other polarized light components compared with the state of polarization before the conversion.

2. The optical information reproduction device according to claim 1, wherein the polarized light component of the reproduction light focused on the recording unit is linearly polarized light that is polarized perpendicular to the track direction of the information recording medium.

3. The optical information reproduction device according to claim 1, wherein the polarized light component of the reproduction light focused on the recording unit is elliptically polarized light whose main component is a polarized light component that is polarized perpendicular to the track direction of the information recording medium.

4. The optical information reproduction device according to claim 1, wherein the optical component functions so as to convert, by utilizing the difference in wavelength, a polarization state of reproduction light emitted from the first semiconductor laser light source and a polarization state of recording light emitted from the first semiconductor laser light source, so that the amplitude of a polarized light component of the reproduction light focused on the recording unit that is polarized perpendicular to the track direction will be greater than that of other polarized light components compared with the state of polarization before the conversion, and so that the recording light focused on the recording unit will be circularly polarized light.

5. The optical information reproduction device according to claim 4, wherein the optical component functions substantially as a $\lambda_1/2$ integer multiple plate with respect to the reproduction light, and functions substantially as a $\lambda_2/4$ plate with respect to the recording light.

6. The optical information reproduction device according to claim 1, wherein
the wavelength $\lambda_1$ of the reproduction light is shorter than the wavelength $\lambda_2$ of the recording light.

7. The optical information reproduction device according to claim 1, wherein
the recording light is pulsed light, and information is recorded by using nonlinear absorption.

8. The optical information reproduction device according to claim 1, further comprising a pinhole plate that is disposed along an optical path between the information recording medium and the first photodetector, and has a pinhole that transmits light conveying target information included in the reflected light.

9. The optical information reproduction device according to claim 8, further comprising a second photodetector for detecting focus/track error signals, and a focus/track error signal detection element that is disposed along the optical path between the information recording medium and the second photodetector, for splitting the reflected light,
wherein at least one of the beams split apart by the focus/track error signal detection element is guided to the second photodetector without passing through the pinhole.

10. The optical information reproduction device according to claim 1, wherein a surface area of a light-receiving component provided in the first photodetector is set to an area over which light conveying target information included in the reflected light is received.

11. The optical information reproduction device according to claim 1, wherein the recording marks are voids.

12. The optical information reproduction device according to claim 1, wherein the recording marks are recording pits produced by refractive index changes of the recording layers.

13. An optical information reproduction device, comprising:
an information recording medium that includes a recording unit having a multilayer structure of recording layers capable of recording information three-dimensionally and from which can be reproduced information recorded on one of recording layers through any of the other recording layer or layers and provided with a track having a specific track pitch, with which information is recorded by forming a plurality of recording marks along the track of the recording unit by a mark length recording method, and when the track direction of the recording marks is assumed to be their longitudinal direction and the direction perpendicular to the track direction is assumed to be their lateral direction, for recording marks located substantially in the same plane, the total area of elongated recording marks, whose longitudinal length is greater than their lateral length, is greater than the total area of recording marks having other than elongated shapes;
a first semiconductor laser light source for emitting reproduction light having a wavelength $\lambda_1$;
an objective lens for focusing the reproduction light emitted from the first semiconductor laser light source on the recording unit of the information recording medium; and
a first photodetector for detecting a reproduction signal from the reflected light from the recording unit;
wherein the information recording medium has a track pitch of no more than 1.3 times the wavelength $\lambda_1$ of the reproduction light, and
an optical component is provided along an optical path between the first semiconductor laser light source and the objective lens so as to convert the state of polarization of the reproduction light emitted from the first semiconductor laser light source, whereby the amplitude of a polarized light component of the reproduction light that is polarized perpendicular to the track direction is caused to be greater than that of other polarized light components compared with the state of polarization before the conversion.

14. The optical information reproduction device according to claim 13, wherein the polarized light component of the reproduction light focused on the recording unit is linearly polarized light that is polarized perpendicular to the track direction of the information recording medium.

15. The optical information reproduction device according to claim 13, wherein the polarized light component of the reproduction light focused on the recording unit is elliptically polarized light whose main component is a polarized light component that is polarized perpendicular to the track direction of the information recording medium.

16. The optical information reproduction device according to claim 13, wherein the first light source further emits recording light with a wavelength of $\lambda_2$,
the objective lens focuses the recording light on the recording unit included in the information recording medium, and
the first semiconductor laser light source has a characteristic such that it emits the recording light in which an amplitude of a polarized light component that is polarized perpendicular to the track direction is greater than that of other polarized light components.

17. The optical information reproduction device according to claim 13, wherein the first semiconductor laser light source further emits recording light with a wavelength of $\lambda_2$,
the objective lens focuses the recording light on the recording unit included in the information recording medium,
the wavelength $\lambda_1$ of the reproduction light is different from the wavelength $\lambda_2$ of the recording light, and
the optical component functions so as to convert, by utilizing the difference in wavelength, a polarization state of reproduction light emitted from the first semiconductor laser light source and a polarization state of recording light emitted from the first semiconductor laser light source, so that the amplitude of a polarized light component of the reproduction light focused on the recording unit that is polarized perpendicular to the track direction will be greater than that of other polarized light components, and so that the recording light focused on the recording unit will be circularly polarized light.

18. The optical information reproduction device according to claim 17, wherein the optical component functions substantially as a $\lambda_1/2$ integer multiple plate with respect to the reproduction light, and functions substantially as a $\lambda_2/4$ plate with respect to the recording light.

19. The optical information reproduction device according to claim 13, wherein the first semiconductor laser light source further emits recording light with a wavelength $\lambda_2$, and
the wavelength $\lambda_1$ of the reproduction light is shorter than the wavelength $\lambda_2$ of the recording light.

20. The optical information reproduction device according to claim 13, wherein the first semiconductor laser light source further emits recording light with a wavelength $\lambda_2$, and
the recording light is pulsed light, and information is recorded by using nonlinear absorption.

21. The optical information reproduction device according to claim 13, further comprising a pinhole plate that is disposed along the optical path between the information recording medium and the first photodetector, and has a pinhole that transmits light conveying target information included in the reflected light.

22. The optical information reproduction device according to claim 21, further comprising a second photodetector for detecting focus/track error signals, and a focus/track error signal detection element that is disposed along the optical path between the information recording medium and the second photodetector, for splitting the reflected light,
wherein at least one of the beams split apart by the focus/track error signal detection element is guided to the second photodetector without passing through the pinhole.

23. The optical information reproduction device according to claim 13, wherein a surface area of a light-receiving component provided in the first photodetector is set to an area over which light conveying target information included in the reflected light is received.

24. The optical information reproduction device according to claim 13, wherein the recording marks are voids.

25. The optical information reproduction device according to claim 13, wherein the recording marks are recording pits produced by refractive index changes of the recording layers.

26. The optical information reproduction device according to claim 13, wherein the optical component functions substantially as a $\lambda_1/2$ integer multiple plate with respect to the reproduction light.

27. The optical information reproduction device according to claim 13, further comprising a second semiconductor laser light source for emitting recording light with a wavelength of $\lambda_2$, wherein
the objective lens focuses the recording light on the recording unit included in the information recording medium, and
the second semiconductor laser light source has a characteristic such that it emits the recording light in which an amplitude of a polarized light component that is polarized perpendicular to the track direction is greater than that of other polarized light components.

28. The optical information reproduction device according to claim 13, wherein the first light source further emits recording light with a wavelength of $\lambda_2$,
the objective lens focuses the recording light on the recording unit included in the information recording medium, and
the optical component also functions so as to convert the state of polarization of the recording light emitted from the first semiconductor laser light source, whereby the amplitude of a polarized light component of the recording light that is polarized perpendicular to the track direction is caused to be greater than that of other polarized light components.

29. The optical information reproduction device according to claim 13, further comprising a second semiconductor laser light source for emitting recording light with a wavelength of $\lambda_2$, wherein
the objective lens focuses the recording light on the recording unit included in the information recording medium, and
another optical component is provided along the optical path between the second semiconductor laser light source and the objective lens so as to convert the state of polarization of the recording light emitted from the second semiconductor laser light source, whereby the amplitude of a polarized light component of the recording light that is polarized perpendicular to the track direction is caused to be greater than that of the other polarized light components.

* * * * *